US006207203B1

(12) United States Patent
Atkinson et al.

(10) Patent No.: US 6,207,203 B1
(45) Date of Patent: Mar. 27, 2001

(54) FORTIFIED COFFEE DRINK

(75) Inventors: Judith R. Atkinson, Powell; David A. Deis, Westerville; Amy L. Marchio, Centerburg, all of OH (US)

(73) Assignee: Abbott Laboratories, Abbott Park, IL (US)

( * ) Notice: Subject to any disclaimer, the term of this patent is extended or adjusted under 35 U.S.C. 154(b) by 0 days.

(21) Appl. No.: 09/124,886

(22) Filed: Jul. 30, 1998

(51) Int. Cl.[7] ................................. A23L 1/30; A23F 5/00
(52) U.S. Cl. ........................... 426/73; 426/594; 426/595
(58) Field of Search ............................. 426/73, 594, 595

(56) References Cited

U.S. PATENT DOCUMENTS

| 5,571,441 | * | 11/1996 | Andon et al. | 426/648 |
| 5,674,522 | | 10/1997 | Shah et al. | 424/439 |
| 5,721,003 | | 2/1998 | Zeller | 426/570 |
| 5,904,948 | * | 5/1999 | Sartorio et al. | 426/588 |

FOREIGN PATENT DOCUMENTS

| 70413/96 | 5/1997 | (AU) . |
| 0 745 333 A1 | 12/1996 | (EP) . |
| WO 96/14757 | 5/1996 | (WO) . |

OTHER PUBLICATIONS

Database Abstract. Publication No. DE004103209C1. For DE 4103209. Inventor: Darboven, Dec. 3, 1992.*
Store Manager's Guide Ensure Nutriccino, Oct. 1997.
GMCI Global Marketing, New Direction in Food and Beverage Marketing, 1997.
Introducing Ensure Nutriccino, 1997.
Clintec Nutrition Company, NuBasics™ Product Label Date Not Available.
Superior Coffee and Foods, Superior® Cappuccino Product Label, 1997.
Ross Products Division Product Handbook, May 1996, Ensure® Complete Balanced Nutrition™, p. 6.

* cited by examiner

*Primary Examiner*—Anthony J. Weier
(74) *Attorney, Agent, or Firm*—Nickki L. Parlet; J. Michael Dixon

(57) ABSTRACT

In general this invention relates to a powder composition that provides a low fat vitamin and mineral fortified coffee drink when reconstituted with water. The nutritional composition being in the form of a soluble powder containing an instant coffee component, a protein component, a vitamin/mineral component providing at least 25% of U.S. RDI per 8 oz serving, and a carbohydrate component in about 140 Cal per 8 oz serving.

10 Claims, No Drawings

FORTIFIED COFFEE DRINK

This invention relates to a low fat vitamin and mineral fortified powder coffee mix and to the fortified coffee drink produced upon reconstitution of the powder mix with hot water.

BACKGROUND

Increased awareness of the benefits attributable to a diet rich in essential nutrients and vitamins have resulted in food processors enriching a variety of food products such as breakfast cereals, breads, milk and juices. The present invention is a twist on this goal by fortifying a beverage that normally does not contribute nutrients to the diet.

Coffee is a widely consumed beverage that provides negligible nutritional support to the consumer. However, it is the primary source of caffeine used by many individuals as their morning stimulant. Caffeine also acts as a diuretic. Consequently, while the consumer is waking up with their morning coffee, the caffeine is flushing water-soluble vitamins from the body faster than usual.

There has been a rise in consumption of all the special blend, full bodied, dark roasted coffees. While the calorie and fat content of these special blends remain negligible, the specialty coffees have less caffeine than the coffee made from cans of regular coffee bought at the supermarket. This is due to the type of beans used for the specialty coffees. The specialty coffees are made from arabica beans that impart a stronger taste but less caffeine than the robusta beans incorporated into the coffee such as Folger's and Maxwell House. In addition the process of dark roasting the coffee beans burns off more caffeine than the light roasting of beans in most supermarket varieties. Caffeine content of coffee from different sources are listed in Table 1. For example, a five-ounce cup of drip coffee contains 110 to 150 milligrams of caffeine depending on how strong it is made. A six ounce cup of Starbuck's coffee has only 81 milligrams of caffeine. The caffeine content of plain espresso is less than a five ounce cup of drip coffee. Latte, mocha drinks and cappuccino are made with a shot of espresso. Consequently the caffeine content of the specialty drinks are also lower than drip coffee.

Variations on a cup of black coffee such as cappuccino, latte, espresso, cafe mocha have become very popular. While the caffeine contents of these specialty drinks are lower than drip coffee, these variations add hidden calories and fat to the coffee beverage. All of the specialty drinks mentioned above start with Espresso which is made from the arabica beans but is brewed with less water. Lafte is espresso diluted with steamed milk topped with frothed milk. Mocha drinks generally contain espresso, less steamed milk than a latte, an ounce or two of mocha or chocolate syrup, and topped with frothed milk. Cappuccino is made with espresso, less steamed milk than a mocha, and a large foam cap frothed from another couple of ounces of milk.

These specialty coffee beverages are replacing the high calorie and high fat snack items in an individuals diet. However, many specialty coffee beverages are made with enough milk and syrup to equal or exceed the fat and calories in traditional desserts. For example, a large Cafe Mocha from Starbucks made with whole milk contains 409 calories and 31 grams of fat. Add whipped cream and the total calories approach 500 calories with 40 grams of fat. Mocha beverages tend to have the most fat and calories in all the gourmet coffee shops, in part because they contain larger quantities of milk and one to two ounces of chocolate syrup. A latte from The Coffee Beanery made with whole milk and topped wvith whipped cream and grated milk chocolate supplies 350 calories and 20 grams of fat. As for cappuccino, it tends to run relatively low in calories and fat as long as whipped cream is not added. A large cappuccino at Au Bon Pain made with 2% fat milk has 156 calories and 6 grams of fat. An added shot of hazelnut, vanilla or some other type of syrup to any of the specialty coffee beverages can add at least another 40 calories. Putting whipped cream on top of any coffee beverage will add in the neighborhood of 60 calories and 5 grams of fat. The fat content in all these specialty coffee beverages can be decreased by making the coffee beverage with skim milk instead of whole or 2% fat milk. Table 1 compares the caffeine, calories and fat content of coffee beverages made with skim, 2% or whole milk from different sources.

TABLE 1

Caffeine, Calorie and Fat Content of Coffee Beverages from Different Sources

| Coffee Beverage | Caffeine (mg) | Calories (skim/2%/whole milk) | Fat (g) (skim/2%/whole milk) |
| --- | --- | --- | --- |
| Coffee, black | | | |
| Dunkin' Donuts (8 oz) | 104 | | |
| McDonald's (6 oz) | 60 | | |
| Starbucks (5.8 oz) | 81 | | |
| Au Bon Pain (9 oz) | 171 | | |
| Instant, Decaf (6 oz) | 2 | | |
| Espresso | | | |
| Starbucks (0.7 oz) | 57 | | |
| Au Bon Pain (2.6 oz) | 130 | | |
| Gloria Jean's Coffee Bean (2.7 oz) | 51 | | |
| Cappuccino | | | |
| Starbucks (8 oz) | 57 | 57/79/99 | 0/3/5 |
| Au Bon Pain (10 oz) | 65 | 71/99 | 0/4 |
| Gloria Jean's Coffee Bean (8 oz) | 51 | 68 | 3 |

TABLE 1-continued

Caffeine, Calorie and Fat Content of Coffee Beverages from Different Sources

| Coffee Beverage | Caffeine (mg) | Calories (skim/2%/whole milk) | Fat (g) (skim/2%/whole milk) |
|---|---|---|---|
| Latte | | | |
| Starbucks (8 oz) | 57 | 68/90/114 | 1/4/6 |
| Au Bon Pain (10 oz) | 65 | 81/113 | 0/5 |
| Gloria Jean's Coffee Bean (8 oz) | 51 | 76 | 3 |
| Cafe Mocha | | | |
| Starbucks (8 oz) | 57 | 156/175/195 | 11/13/15 |
| Au Bon Pain (10 oz) | 65 | 120/153 | 1/5 |
| Gloria Jean's Coffee Bean (8 oz) | 51 | 222 | 4 |
| Cold Coffee beverages | | | |
| Starbucks Iced Cafe Mocha (12 oz) | 57 | 201/235/271 | 11/16/19 |
| Au Bon Pain Iced Mocha Blast (16 oz) | 130 | 180/221 | 1/6 |
| Gloria Jean's Coffee Bean Iced Mocha (12 oz) | 51 | 282 | 6 |

As more consumers add these specialty coffee beverages to their diets, a class of instant coffee powders, such as Maxwell House's Cappuccino Mocha and a growing variety of General Food's International Coffees, have become popular for at home use. Additionally, these instant coffee drinks may be purchased at convenience stores from hot beverage dispensers. Table 2 describes the total calories, fat, protein, carbohydrate and vitamin/mineral fortification of commercially available instant coffee powders.

The low fat fortified coffee drink of this invention improves upon the instant coffee powders purchased at supermarket stores or the coffee drinks purchased from hot beverage dispensers in convenience stores by providing 19 vitamins and minerals, and supplemental protein in a low fat instant flavored coffee drink.

TABLE 2

Instant Coffee Drinks

| Coffee Drink (powder serving, fl. oz) | Cal. | Fat (gm) | Protein (gm) | Carbohydrates (gm) | Vit./Min. (% RDI) |
|---|---|---|---|---|---|
| General Foods International Coffees Italian Cappuccino (13 gm, 8 fl. oz) | 60 | 2 | <1 | 10 | none |
| Maxwell House Cappuccino Coffee (23 gm, 8 fl. oz.) | 100 | 2.5 | 2 | 17 | Calcium 8 |
| Superior Cappuccino (16 gm, 8 fl. oz.) | 70 | 2.5 | <1 | 11 | Vit. C 4 Calcium 2 |

Conventional dry mix instant hot cappuccino compositions include a coffee component, a foaming creamer component, and optional sweetener, flavor, color and foam stabilizer components. The compositions are normally provided as a particulate powder or granular composition. A hot cappuccino drink is prepared by dissolving the instant cappuccino composition in a hot liquid such as hot water or hot milk. Sweetener, if not present in the composition, is normally added when the beverage is prepared. As described above, hot cappuccino beverages have a substantial and characteristic foam on the top surface of the beverage. In the case of a brewed cappuccino, the foam is usually provided by steamed milk. In an instant cappuccino product, the foam is provided by a particulate dry mix foaming creamer that may be of the dairy or nondairy type. The foaming creamers have a gas incorporated in the matrix that is incorporated into the creamer during its preparation. The amount of foam produced by the creamer depends on the amount of gas that is incorporated into the creamer. However, there is a limit to the amount of gas that can be incorporated into a creamer before the foam is destabilized.

U.S. Pat. No. 5,721,003 to Zeller discloses a particulate dry mix foaming creamer that does not require incorporation of a gas. The instant dry mix hot cappuccino product composition comprises a water soluble coffee component, a foam generating component, an optional creamer and sweetener component. The coffee component is from 0.75 to 5 grams per serving. The dry mix foaming creamer comprises a creamer and a foam generating component comprising gluconolactone and an alkali metal carbonate or bicarbonate. The carbonate or bicarbonate are present in an amount of from 1 to 10% by weight based on the weight of the creamer. The gluconolactone is present in an amount of from 1 to 35% by weight based on the weight of the creamer. The sweetener component is in an amount equivalent to from 1 to 20 parts by weight of sucrose per part by weight of the coffee component. The cappuccino beverage is prepared by mixing milk or water with the dry mix composition and heating.

At the other end of the spectrum from retail instant coffee drinks are institutional coffee flavored complete nutritional beverages. For example, coffee flavored ENSURE distributed by Ross Products a Division of Abbott Laboratories and an institutional product distributed by Clintec Nutrition from Nestle & Baxter under the trade name NuBasics. Coffee flavored ENSURE provides 250 calories in 8 fl. oz. The protein (9 gm) provides 12% of total calories, carbohydrate (40 gm) provides 64% of total calories, fat (6 gm) provides 22% of the total calories and the vitamins and minerals are fortified at 30% of the RDI. NuBasics is labeled as providing 3 grams of fat, 19 grams of carbohydrate and 6 grams of protein in 130 calories. The vitamins and minerals are listed as providing from 6% to 15% of the RDI with vitamin C and B6 listed at 35% and 20% of the RDI, respectively. NuBasics uses decaffeinated coffee as a flavoring, while Ensure uses a natural and artificial coffee flavoring to achieve the final coffee flavor.

AU A 70413/96 to J. Burri, et al., discloses a powdered nutritional composition that when reconstituted in water provides a complete, nutritionally balanced coffee drink. The nutritional composition is an agglomerated powder formed of soluble coffee powder, a protein component, a carbohydrate component and a lipid component. The protein component provides about 16% to 30% of calories. The carbohydrate provides about 40% to 60% of calories, the lipid component provides 15% to 33% of calories. The nutritional composition readily dissolves in hot water to provide a beverage that looks and tastes like black coffee which may be administered to a patient in need of nutritional support, particularly elderly and long-term care patients.

Other prior art fortifies the coffee beans or grounds with water soluble vitamins. WO 96/14757 to S. Rich describes a method to vitamin enrich coffee by blending powdered water soluble vitamins with ground coffee beans to form a homogeneous blend suitable for brewing. Alternatively, coffee beans are rinsed with water soluble vitamin-containing solution and allowed to dry. The vitamin carrying beans are then ground and brewed in the conventional manner.

The use of hot coffee, tea and soup as carriers of pharmaceutical actives is described in U.S. Pat. No. 5,674,522 to M. Shah. The beverage concentrate is suitable for delivering orally administrable pharmaceutical actives. The beverage concentrate contains an instant food, the pharmaceutical active and sweetening and flavoring agents. The pharmaceutical actives are selected form the group consisting of antitussives, expectorants, antihistamines, sympathomimetics, laxatives, antidiarrheals, and mixtures thereof. The concentrate produces a pleasant tasting beverage when dissolved in hot water.

The increased consumption of instant coffee drinks has resulted in the addition of excess calories and fat to the diet of consumers. There is need for a convenient, good tasting, healthy alternative to coffee drinks. The fortified coffee drink of this invention provides a good tasting, low fat, vitamin and mineral fortified coffee drink that may be prepared at home or purchased from hot beverage dispenser machines in convenience stores.

SUMMARY OF THE INVENTION

In general this invention relates to a powder coffee mix that provides a low fat vitamin and mineral fortified coffee drink when reconstituted with hot water. The soluble powder mix comprises an instant coffee component from about 2% to about 12% wt/wt, more preferably from about 2% to about 7% wt/wt, most preferably from about 2% to about 4% wt/wt. The protein component contributes from about 7% to 50% wt/wt, more preferably from about 7% to about 25% wt/wt, most preferably from about 7% to about 15% wt/wt. The carbohydrate component contributes from about 25% to about 90% wt/wt, more preferably from about 30% to about 80% wt/wt, most preferably from about 40% to about 70% wt/wt. The vitamin/mineral component comprises a vitamin/mineral premix that contributes from about 0.2% to about 2% wt/wt, more preferably the vitamin/mineral premix contributes from about 0.2% to about 1% wt/wt. For the low fat powder coffee mix, the fat component contributes no greater than about 9% wt/wt, more preferably no greater than about 7.5% wt/wt.

A second embodiment of the invention relates to the reconstituted fortified coffee drink comprising instant coffee, protein from about 0.7% to about 5% DV for protein per fl. oz., more preferably from about 0.9% to about 2% DV for protein per fl. oz. The vitamin mineral fortification rate for the reconstituted coffee drink is from about 1.25% to about 12.5% of the RDI for vitamins and minerals per fl. oz., more preferably at least from about 2.5% of the RDI for vitamins and minerals per fl. oz. most preferably from about 3% to about 7.5% of the RDI for vitamins and minerals per fl. oz.

Preferably the calcium and phosphorus are in a 1:1 ratio at levels from about 3.75% to about 7.5% of the RDI per fl. oz.. Further the preferred instant coffee drink provides vitamin A and D from about 3.75% to about 7.5% of the RDI per fl. oz. The preferred coffee drink provides from about 0.4% to about 1.6% the DV for carbohydrate per fl. oz., more preferably from about 0.8% to about 1.2% of the DV for carbohydrate per fl. oz. Preferably, the fat level is no greater than that allowed for a low-fat food claim, more preferably no greater than about 0.75% DV for fat per fl. oz., most preferably no greater than about 0.65% DV per fl. oz.

DETAILED DESCRIPTION OF THE INVENTION

As used herein, any reference to the "RDI for vitamins and minerals" should be construed as referring to the list published in the 1993 Federal Register, Vol. 58. RDIs are a set of dietary references based on the Recommended Dietary Allowances (RDA) for essential vitamins and minerals. The name "RDI" replaces the term. "U.S. RDA"(Recommended Daily Allowances). Recommended Dietary Allowances (RDA) are the set of estimated nutrient allowances established by the National Academy of Sciences used as the basis for setting the U.S.RDAs. Since this list is updated periodically to reflect current scientific knowledge, this invention should be construed as encompassing such future changes as well.

As used herein, any reference to the "DV for protein, fat and carbohydrates" should be construed as referring to the Daily Values based on a 2000 calorie diet. Daily Values (DVs) are a set of dietary reference values to help consumers use food label information to plan a healthy overall diet. DVs actually comprise two sets of reference values for nutrients: Daily Reference Values (DRVs) and Reference Daily Intakes (RDI). DRVs are a set of dietary references for which no set of standards previously existed. DRVs apply to fat, saturated fat, cholesterol, carbohydrate, protein, fiber, sodium and potassium. Based on 2,000 calories a day for adults and children over 4, the DRV for fat is 65 grams; saturated fat is 20 gm; cholesterol is 300 milligrams; total carbohydrate is 300 grams; fiber is 25 grams; sodium is 2,400 milligrams; potassium is 3,500 milligrams; and protein is 50 grams.

The term "single serving and individual serving" are used interchangeably and refer to the amount capable of being consumed in one sitting or preferably about 200 to 300 ml.

The term "coffee beverage" refers to the coffee purchased from coffee houses that use espresso or regular drip coffee to make the specialty coffees.

The terms "coffee drink, instant coffee drink" are used interchangeably and refer to the instant coffee powders purchased in supermarkets or reconstituted coffee drinks purchased from hot beverage dispensers in convenience stores.

As used herein, any reference to the term "low fat" refers to the NLEA rules published in the January 1993 Federal Register defining low fat as 3 grams or less per serving.

As used herein, the term agglomerated refers to the process of drying a solution of solids. One way to carry out the instantizing process of agglomeration is to lengthen the time the particles stay in the spray dryer causing dry particles to collide with less-dry particles forming clusters. These clusters have many voids and sink in water. Therefore, the agglomerated ingredient is easier to dissolve than spray dried particles that are small in size, float on water, and are difficult to wet.

The terms "instant coffee, soluble coffee solids and coffee solids" are used interchangeably and refer to the dry product formed by freeze drying or spray drying a solution of brewed coffee. P The term wt/wt refers to weight/weight (i.e., the weight of the component based upon the weight of the total composition).

In general, this invention relates to a powder fortified coffee composition and to the low-fat fortified coffee drink formed when the powder is reconstituted with water. The soluble powder composition comprises an instant coffee component from about 2% to about 12% wt/wt, more preferably from about 2% to about 7% wt/wt, most preferably from about 2% to about 4% wt/wt; a protein component providing from about 7% to 50% wt/wt, more preferably from about 7% to about 25% wt/wt, most preferably from about 7% to about 15% wt/wt; a carbohydrate component providing from about 25% to about 90% wt/wt, more preferably from about 30% to about 80% wt/wt, most preferably from about 40% to about 70% wt/wt; and a vitamin/mineral component provided by from about 0.2% to about 2% wt/wt of a vitamin/mineral premix, more preferably from about 0.2% to about 1% wt/wt of a vitamin/mineral premix; a fat component providing no greater than about 9% wt/wt, more preferably no greater than about 7.5% wt/wt.

The coffee component is very important to the overall flavor of the final product. The coffee component comprises any type of powdered or granular dry soluble coffee solids. The freeze dried or spray dried instant coffee component is optionally milled to a particle size that is compatible with the other powder ingredients in the mixture to improve filling efficiencies, improve dispersability and increase powder flowability of the mix thereby reducing clogging of the dispensers. The amount of the coffee component in the composition will vary depending on the desired strength or flavor of the final coffee beverage. As stated above the coffee component comprises from about 2% to about 12% wt/wt. Commercially available instant coffee with or without caffeine is selected for optimum roasted coffee flavor characteristics and the lack of the characteristic "green bean note". The coffee useful for this invention may be purchased from distributors including Mother Parker's Tea and Coffee, Wadsworth, Ohio, and American Instants, Inc., Flanders, N.J.

In addition to giving the coffee beverage the appearance of added milk, the protein component provides the supplemental protein of the product and helps to form the foam on the liquid product. The preferred coffee drink provides from about 0.7% to about 5% DV for protein per fl. oz., more preferably from about 0.9% to about 2% DV for protein per fl. oz. Any good tasting powder or agglomerated protein may be used. Protein useful for this invention may be purchased from various distributors including Protein Technologies International, St. Louis, Miss. and Land O'Lakes Food Ingredients Division, Minneapolis, Minn. Preferably the protein is in the agglomerated form that matches the particle size of the other powder ingredients in the mixture to improve filling efficiencies, improve dispersability reduce dusting during filling and increase powder flowability of the mix thereby reducing clogging of the dispensers. The protein component is selected from the group consisting of casein, whey, condensed skim milk, nonfat milk, soy, pea, rice, corn, hydrolyzed protein and mixtures thereof. Preferably the protein is fortified with vitamins such as vitamin A and D. Optionally, the protein is fortified with minerals such as calcium. The mineral fortified protein source contains calcium in a colloidal suspension with the protein. U.S. Pat. No. 4,642,238 by H. C. Santz, et al., teaches how to produce a mineral enriched protein by combining a hydrated gel of an alkaline earth salt with protein isolate to form a mineral enriched protein composition.

The vitamin and mineral component is provided by a vitamin/mineral premix that comprises from about 0.2% to about 2% wt/wt of the powder coffee mix. The vitamin mineral fortification rate for the reconstituted coffee drink is from about 1.25% to about 12.5% of the RDI for vitamins and minerals per fl. oz., more preferably at least from about 2.5% of the RDI for vitamins and minerals per fl. oz, most preferably from about 3% to about 7.5% of the RDI for vitamins and minerals per fl. oz. The vitamin/mineral premix provides a mixture of the group consisting of vitamin A, vitamin D, vitamin E, riboflavin, vitamin B6, vitamin B12, pantothenic acid, vitamin C, thiamin, niacin, folate, biotin, iodine, zinc, iron, copper and manganese.

Representative ranges for a dry blended premix of water soluble and water dispersible vitamins and minerals useful in this invention are described in Table 3 below. Those knowledgeable in the art would be able to select the individual vitamin and mineral sources and dry blend them with an acceptable carrier to form a vitamin/mineral premix useful for this invention. U.S. Pat. No. 5,221,545 to Borschel, et al., describes how to manufacture a mineral premix by dry blending the individual minerals, this patent is incorporated herein by reference. While the use of a premix facilitates the dry blending of the instant coffee mix and decreases the cost of testing for the vitamin and minerals in the final mix, each vitamin and mineral component may be added individually during the dry blending process.

TABLE 3

Vitamin/Mineral Premix

| Components | Range per gm premix | Preferred Range per gm premix |
|---|---|---|
| Ascorbic acid | 145–223 mg | 161–203 mg |
| Alpha tocopheryl acetate | 40–59 IU | 44–54 IU |
| Niacinamide | 27–38 mg | 29–35 mg |
| Calcium pantothenate | 20–30 mg | 22–28 mg |
| Pyridoxine hydrochloride | 3.3–5.5 mg | 3.6–5.0 mg |
| Vitamin A palmitate | 11,970–17,710 IU | 13,300–16,100 IU |
| Thiamine hydrochloride | 1.8–3.6 mg | 2–3.3 mg |
| Riboflavin | 2.3–3.8 mg | 2.5–3.5 mg |
| Folic acid | 0.72–1.3 mg | 0.8–1.2 mg |
| Biotin | 0.38–0.72 mg | 0.4–0.66 mg |
| Vitamin $D_3$ | 649–960 IU | 721–873 IU |
| Cyanocobalamin | 11–17 mcg | 12–16 mcg |
| Zinc | 20–28 mg | 22–26 mg |
| Iron | 24–34 mg | 26–31 mg |
| Manganese | 2.7–4.4 mg | 3–4 mg |
| Copper | 2.7–3.8 mg | 3–3.5 mg |
| Iodine | 0.18–0.37 mg | 0.2–0.34 mg |

Water soluble vitamin fortification of the coffee drink will help replenish the water soluble vitamins flushed through the body by the diuretic effect of the caffeine. The use of vitamin fortified protein sources, such as vitamin A and D fortified nonfat dry milk, provides for increased levels of vitamin A and D. Further the preferred instant coffee drink provides vitamin A and D from about 3.75% to about 7.5% of the RDI per fl. oz.

Preferably the levels of the minerals involved in bone health, such as calcium and phosphorus, are increased. Calcium and phosphorus levels of from about 3.75% to about 7.5% of the RDI per fl. oz. are preferred. Further the preferred instant coffee drink provides about a 1:1 ratio of calcium to phosphorus. The calcium source may be selected from the group including, but not limited to, tricalcium phosphate, calcium carbonate, calcium oxide, calcium gluconate, calcium glycerophosphate, dicalcium phosphate and mixtures thereof. Other calcium sources include calcium bound to proteins such as calcium caseinate and the inherent calcium contributed by milk products. The preferred calcium source is tricalcium phosphate (TCP), as more calcium is provided in a smaller volume of powder and it may be sourced at different particle sizes that is to important in filling efficiencies, dispersability and powder flowability of the mix thereby reducing clogging of the hot beverage dispensers. The selection of micronized TCP (mTCP) (Mallinckrodt, Inc., Charlotte, N.C.) provides smaller particles that provide for better suspension of the insoluble calcium in the coffee drink. Preferably mTCP is present at a level of from about 1% to about 5% wt/wt of the coffee mix.

An added benefit of the TCP is the discovery that it acts as a flowing agent in the coffee mix, and therefore prevents the clogging of the hot beverage dispensers observed with mix lacking the tricalcium phospahte.

The carbohydrate component acts as a sweetener and carrier of the other components. It is present in an amount sufficient to provide sweetness to complement the flavor of the coffee drink. Natural sugar sweeteners such as granulated sucrose, glucose, glucose polymers, fructose are preferred. Other carbohydrates such as hydrolyzed corn starch, maltodextrin, corn syrup solids, lactose, high fructose corn syrup, fructooligosaccharides may be employed alone or in combination with sucrose. Alternatively, an artificial sweetener, such as Aspartame, sucralose, cyclamates and acesulfame potassium, may be added to decrease the calories contributed by natural sweeteners. The preferred coffee drink provides from about 0.4% to about 1.6% the DV for carbohydrate per fl. oz., more preferably from about 0.8% to about 1.2% the DV for carbohydrate per fl. oz.

The fat may be selected from the group including, not limited to, hydrogenated soy oil, hydrogenated coconut oil, high oleic safflower oil, soy oil, fractionated coconut oil, high oleic sunflower oil, corn oil, canola oil and mixtures thereof. Additionally, the fat may be provided as inherent components of specific ingredients, such as fats that are components of creamers and inherent fat in milk. Preferably, the fat level is no greater than that allowed for a low-fat food claim, more preferably no greater than about 0.75% DV for fat per fl. oz., most preferably no greater than about 0.65% DV per fl. oz.

The caloric content of the coffee beverages produced with the fortified powdered coffee mix of the instant invention can vary widely. As noted above, each ounce of the reconstituted coffee beverage will supply from about 0.7% to about 5% of the DV for protein per fl. oz. Therefore, each fluid oz. will provide from about 1.4 to about 10 calories solely from the protein content. Each fluid oz. will provide from no more than about 0.75% of the DV for fat, corresponding to about 0–4 calories per fluid oz., solely from fat. The carbohydrate is typically present at a range designed to provide from about 0.4–1.6% of the DV, resulting in a caloric content of from about 8–18 calories per oz., solely from the carbohydrate.

The caloric content of the final beverage can vary widely but typically will be no more than 250 calories per 8 fl. oz., more preferably less than 200 calories and most preferably from 100–150 calories. The source of the calories can be varied depending upon the nutritional status of the consumer, the presence of underlying diseases, etc. A powder can be blended to have a higher proportion of protein resulting in a higher relative percentage of calories being derived from protein. Alternatively, more relative calories can be derived from carbohydrates. The caloric content provided by carbohydrates can also be reduced via the use of low calorie artificial sweeteners as described above. Such manipulations are well within the skill of a food scientist and are readily known to those skilled in the art.

When optimizing a low-fat or nonfat product, the desirable mouth feel that would normally be provided by fat is provide by stabilizers. Suspension of insoluble minerals and mouth feel is improved by using one or more stabilizers. Useful stabilizers include, but are not limited to, cellulose gel, carboxymethyl cellulose, zanthan gum, microcrystaline cellulose and carrageenans. The preferred stabilizer comprises from about 1% to about 4% wt/wt carboxymethyl cellulose, more preferably from about 2% to about 3% wt/wt carboxymethyl cellulose.

The coffee beverage of the present invention will also desirably include a flavoring and or color to provide the coffee drinks with an appealing appearance and an acceptable taste for oral consumption. Useful flavorings include, for example, chocolate, hazelnut, vanilla, banana nut, Irish cream, chocolate mint, raspberry mocha, cinnamon vanilla, almond, Amaretto and caramel.

Powder characteristics are important in filling the pouches, dispersing the powder in the hot liquid and in the flowability through the dispenser. The preferred bulk density of the final coffee mix is from about 0.5 gm/cc to about 0.9 gm/cc, more preferred form about 0.5 gm/cc to about 0.7 gm/cc.

The amount of the coffee mix to utilize to produce the fortified coffee beverage can vary widely. However, with the nutritional guidelines outlined above for the reconstituted drink, one skilled in the art can readily calculate the amount of the powdered mix required. The quantity will be such that it can be easily diluted in an amount of liquid that can be consumed as a single serving. The quantity of powder will typically range from 10–100 grams, more preferably less than 50 grams.

The coffee mix of this invention can be manufactured using techniques well known to those skilled in the art. While manufacturing variations are certainly well known to those skilled in the powder formulation arts, a few of the manufacturing techniques are described in detail in the Examples. Generally, a blender is selected depending on the size of the batch, the type of ingredients in the formula and the desired characteristics of the final blended powder. The smaller volume ingredients are typically mixed together in a pre-blend and then added to the larger volume ingredients for a final blend. The rate of the blender and length of the blend is determined experimentally by evaluating the final powder characteristics.

The final coffee mix is packaged for sale. An opaque pouch material with an oxygen and moisture barrier is preferred to optimize vitamin stability and prevent caking of the mix.

EXAMPLE 1

Table 4 presents a bill of materials for manufacturing 454 kg of a nonfat powdered vanilla flavored coffee mix according to the present invention. A detailed description of its manufacture follows.

TABLE 4

Bill of Materials
Nonfat Vanilla Flavored Coffee Mix

| Ingredient Name | per 454 kg |
|---|---|
| Agglomerated Nonfat Dry Milk | 263 kg |
| Granular Sugar | 150 kg |
| Instant Coffee | 14 kg |
| Nat. & Art. Vanilla | 9.5 kg |
| Cocoa Powder | 7.6 kg |
| Magnesium Carbonate | 3.3 kg |
| Vitamin/Mineral Premix | 2 kg |
| Ascorbic Acid | 384 gm |
| Ferric Orthophosphate | 215 gm |
| Zinc Sulfate | 139 gm |

TABLE 4-continued

Bill of Materials
Nonfat Vanilla Flavored Coffee Mix

| Ingredient Name | per 454 kg |
|---|---|
| dl Alpha Tocopheryl Acetate | 104 gm |
| Niacinamide | 68 gm |
| d-Calcium pantothenate | 52 gm |
| Manganese Sulfate | 26 gm |
| Cupric Sulfate | 17 gm |
| Vitamin A Palmitate | 17 gm |
| Pyridoxine Hydrochloride | 9 gm |
| Riboflavin | 6 gm |
| Thiamine Chloride Hydrochloride | 6 gm |
| Folic Acid | 2 gm |
| Biotin | 1 gm |
| Potassium Iodide | 0.6 gm |
| Vitamin D3 | 0.039 gm |
| Cyanocobalamin | 0.029 gm |
| Nat. & Art. Coffee Mocha | 1.3 kg |
| Carrageenan | 862 gm |

Freeze dried coffee distributed by Mother Parker's, Wadsworth, Ohio is milled just prior to manufacture resulting in the freshly milled flavor. A Quadro Comil Model #194S is used to reduce the particle size 100–200 micrometers of the freeze dried coffee. A #813 screen is installed into the Comil. With the Comil turned on, the appropriate amount of freeze dried coffee is slowly added. The milled coffee is collected into an appropriately labeled vessel. The coffee is be milled within 8 hours of dry blending.

The following ingredients for a 908 kg batch are added to a ribbon blender in the order indicated. Each ingredient is divided equally through each dump chute. Approximately one half of the agglomerated nonfat dry milk distributed by Land O'Lakes Food Ingredients Division, Minneapolis, Minn. is added to the blender. All of the sugar and cocoa powder is added to the blender. The above ingredients are blended for 3 minutes at 35 revolutions per minute. All of the instant coffee that had been previously milled, along with all of the natural and artificial vanilla, magnesium carbonate, vitamin/mineral premix (Fortitech, Inc., Schenectady, N.Y.), natural and artificial mocha flavor, carrageenan (FMC Corp., Philadelphia, Pa.) are added to the blender through each dump chute. The remaining agglomerated nonfat dry milk is the final ingredient added to the blender. The above ingredients are blended for an additional 15 minutes at 35 revolutions per minute. Preferably, after the above steps have been completed, appropriate analytical testing for quality control is conducted. The fortified coffee mix is filled into polyester film pouches (foil lined).

EXAMPLE II

Table 5 presents a bill of materials for manufacturing 454 kg of a nonfat powdered mocha flavored coffee mix according to the present invention. A detailed description of its manufacture follows.

TABLE 5

Bill of materials
Nonfat Mocha Flavored Coffee Mix

| Ingredient Name | per 454 kg |
|---|---|
| Agglomerated Non Fat Dry Milk | 263 kg |
| Granular Sugar | 146 kg |
| Cocoa Powder | 20 kg |
| Instant Coffee | 14 kg |

TABLE 5-continued

Bill of materials
Nonfat Mocha Flavored Coffee Mix

| Ingredient Name | per 454 kg |
|---|---|
| Magnesium Carbonate | 3.3 kg |
| Nat. & Art. Mocha Flavor | 2.7 kg |
| Vitamin Mineral Premix | 2 kg |
| Ascorbic Acid | 359 gm |
| Ferric Orthophosphate | 213 gm |
| Zinc Sulfate | 136 gm |
| dl Alpha Tocopheryl Acetate | 103 gm |
| Niacinamide | 67 gm |
| d-Calcium pantothenate | 51 gm |
| Manganese Sulfate | 25 gm |
| Cupric Sulfate | 17 gm |
| Vitamin A Palmitate | 16 gm |
| Pyridoxine Hydrochloride | 8.6 gm |
| Riboflavin | 6.4 gm |
| Thiamine Chloride Hydrochloride | 6.4 gm |
| Folic Acid | 2.3 gm |
| Biotin | 1.4 gm |
| Potassium Iodide | 0.817 gm |
| Vitamin D3 | 0.036 gm |
| Cyanocobalamin | 0.032 gm |
| Carrageenan | 0.966 kg |
| Vanilla Flavor | 0.396 kg |
| Ethyl Vanillin | 0.315 kg |
| Chocolate Flavor | 0.197 kg |

The freeze dried coffee distributed by Mother Parker's, Wadsworth, Ohio is milled as described in Example I. The following ingredients for a 908 kg batch are added to a ribbon blender in the order indicated. Each ingredient is divided equally through each dump chute. Approximately one half of the agglomerated nonfat dry milk distributed by Land O'Lakes, Minneapolis, Minn. is added to the blender. All of the sugar and cocoa powder is added to the blender. The above ingredients are blended for 3 minutes at 35 revolutions per minute. All of the instant coffee that had been previously milled, along with all of the natural and artificial mocha flavor, magnesium carbonate, vitamin/mineral premix (Fortitech, Inc., Schenectady, N.Y.), vanilla flavor, carrageenan (FMC Corp., Philadelphia, Pa.), ethyl vanillin, chocolate flavor are added equally through each dump chute. The remaining agglomerated nonfat dry milk is added to the blender. The above ingredients are blended for an additional 15 minutes at 35 revolutions per minute. Preferably, after the above steps have been completed, appropriate analytical testing for quality control is conducted. The fortified coffee mix is filled into polyester film pouches (foil lined).

EXAMPLE III

Table 6 presents a bill of materials for manufacturing 454 kg of a low-fat powder vanilla flavored coffee mix according to the present invention. A detailed description of its manufacture follows.

TABLE 6

Bill of Materials
Low Fat Vanilla Flavored Coffee Mix

| Ingredient | per 454 kg |
|---|---|
| Granular Sugar | 188 kg |
| Agglomerated non fat dry milk | 137 kg |
| Creamer | 69 kg |
| Instant Coffee | 15 kg |
| Micronized Tricalcium Phosphate | 13 kg |

TABLE 6-continued

Bill of Materials
Low Fat Vanilla Flavored Coffee Mix

| Ingredient | per 454 kg |
|---|---|
| Carboxymethyl cellulose | 12.5 kg |
| Cocoa Powder | 6 kg |
| Magnesium Carbonate | 5 kg |
| Natural & Artificial Vanilla | 2.8 kg |
| Vitamin/Mineral Premix | 2.5 kg |
| Ascorbic Acid | 456 gm |
| Ferric Orthophosphate | 255 gm |
| Zinc Sulfate | 165 gm |
| dl Alpha Tocopheryl Acetate | 123 gm |
| Niacinamide | 81 gm |
| d-Calcium Pantothenate | 62 gm |
| Manganese Sulfate | 31 gm |
| Cupric Sulfate | 21 gm |
| Vitamin A Palmitate | 20 gm |
| Pyridoxine Hydrochloride | 10 gm |
| Riboflavin | 7 gm |
| Thiamin Cl Hcl | 7 gm |
| Folic Acid | 2.5 gm |
| Biotin | 1.3 gm |
| Potassium Iodide | 0.73 gm |
| Vitamin D3 | 0.045 gm |
| Cyanocobalamin | 0.036 gm |
| Sodium Chloride | 1 kg |

The following ingredients for a 454 kg batch are added to a ribbon blender in the order indicated. Each ingredient is divided equally through each dump chute. Add all the creamer (Kerry's San-a-Creme Creamer, Kerry Ingredients), sugar and cocoa powder to the blender. Blend the above ingredients for 3 minutes at 35 revolutions per minute. Add all of the spray dried instant coffee (Mother Parker's Tea and Coffee), natural and artificial vanilla, magnesium carbonate, micronized tricalcium phosphate (Mallinckrodt, Inc., Charlotte, N.C.), vitamin/mineral premix, carboxymethyl cellulose (TIC Gums, Inc.), sodium chloride, and agglomerated nonfat dry milk to the blender. Blend the above for an additional 15 minutes at 35 revolutions per minute. Preferably, after the above steps have been completed, appropriate analytical testing for quality control is conducted. The fortified coffee mix is filled into large size "multi-serving" pouches (fill weight target 828 gm) and small size "individual serving" pouches (fill weight target 40 gm). Standard pouch material with a moisture and oxygen barrier is the pouch material of choice.

EXAMPLE IV

Table 7 presents a bill of materials for manufacturing 454 kg of a low-fat powder chocolate flavored coffee mix according to the present invention. A detailed description of its manufacture follows.

TABLE 7

Bill of Materials
Low Fat Chocolate Flavored Coffee Mix

| Ingredient | per 454 kg |
|---|---|
| Granular Sugar | 216 kg |
| Agglomerated non fat dry milk | 107 kg |
| Creamer | 60 kg |
| Cocoa Powder | 25 kg |
| Instant Coffee | 13 kg |
| Micronized tricalcium phosphate | 11.6 kg |
| Carboxymethylcellulose | 11 kg |
| Magnesium Carbonate | 4.5 kg |

TABLE 7-continued

Bill of Materials
Low Fat Chocolate Flavored Coffee Mix

| Ingredient | per 454 kg |
|---|---|
| N&A Vanilla Flavor | 2.4 kg |
| Vitamin Mineral Premix | 2.2 kg |
| Ascorbic Acid | 372 gm |
| Ferric Orthophosphate | 220 gm |
| Zinc Sulfate | 141 gm |
| dl Alpha Tocopheryl Acetate | 106 gm |
| Niacinamide | 69 gm |
| d-Calcium Pantothenate | 53 gm |
| Manganese Sulfate | 23 gm |
| Cupric Sulfate | 18 gm |
| Vitamin A Palmitate | 17 gm |
| Pyridoxine Hydrochloride | 9 gm |
| Riboflavin | 6.5 gm |
| Thiamin Cl Hcl | 6.5 gm |
| Folic Acid | 2.3 gm |
| Biotin | 1.4 gm |
| Potassium iodide | 0.85 gm |
| Vitamin D3 | 0.046 gm |
| Cyanocobalamin | 0.03 gm |
| Sodium Chloride | 0.87 kg |

The following ingredients for a 454 kg batch are added to a ribbon blender in the order indicated. Each ingredient is divided equally through each dump chute. Add all the creamer (Kerry's San-a-Creme Creamer, Kerry Ingredients), sugar and cocoa powder to the blender. Blend the above ingredients for 3 minutes at 35 revolutions per minute. Add all of the spray dried instant coffee (Mother Parker's Tea and Coffee), natural and artificial vanilla, magnesium carbonate, micronized tricalcium phosphate (Mallinckrodt, Inc.), vitamin/mineral premix, carboxymethyl cellulose (TIC Gums, Inc.), sodium chloride, and agglomerated nonfat dry milk to the blender. Blend the above for an additional 15 minutes at 35 revolutions per minute. Preferably, after the above steps have been completed, appropriate analytical testing for quality control is conducted. The fortified coffee mix is filled into large size "multi-serving" pouches (fill weight target 828 gm±5 gm) and small size "individual serving" pouches (fill weight target 40 gm±2 gm). Standard pouch material with a moisture and oxygen barrier is the pouch material of choice.

EXAMPLE V

The fortified coffee drink is formed by dissolving approximately 40 gms of the dry blended powder mixture of Example I, II, III or IV in approximately 7 fl. oz. of hot water. The powder dissolves almost instantly and produces a foam when reconstituted by hand or through the hot beverage dispenser.

The hot coffee beverage dispenser used in the commercial setting is designed to deliver an 8 oz. serving in special 10 oz. cups to allow room for the foam that is formed during dispersion. The bulk powder is added to a hopper in the dispenser. When the fill button is pressed, approximately 40 gm of powder is dispensed through the product guide at the bottom of the hopper to the mixing bowl where the powder is mixed with approximately 7 oz of hot water. The hot beverage flows to the whipper chamber where it is whipped and made frothy by the action of a whipper blade assembly. The whipped beverage passes through the extension tubes and into a 10 oz. cup. The resulting coffee drink looks like a flavored cappuccino.

Alternatively, the approximately 40 gm of powder from a single serving pouch is dissolved by stirring the powder into a cup containing approximately 7 oz of hot water.

What is claimed is:

1. A soluble coffee powder mix comprising:
   (a) from about 2% to about 4% wt/wt of an instant coffee component;
   (b) from about 15% to about 50% wt/wt of a protein component;
   (c) from about 0.2% to about 2% wt/wt of a vitamin/mineral premix;
   (d) from about 25% to about 90% wt/wt of a carbohydrate component;
   (e) a fat component present in an amount no greater than about 9% wt/wt;
   (f) from about 1% to about 5% wt/w of tricalcium phosphate, and;
   (g) wherein said coffee mix has a bulk density of from about 0.5 gm/cc to about 0.9 gm/cc.

2. A powder mix according to claim 1 in which the instant coffee component is selected from the group consisting of spray dried coffee, freeze dried coffee and mixtures thereof.

3. A powder mix according to claim 2 in which the instant coffee is decaffeinated.

4. A powder mix according to claim 1 in which the protein component is selected from the group consisting of casein, whey, non fat milk, condensed skim milk, soy, corn, rice, pea, hydrolyzed protein and mixtures thereof.

5. A powder mix according to claim 1 in which the vitamin/mineral premix is present in an amount from about 0.2% to about 1% wt/wt.

6. A powder mix according to claim 5 in which the vitamin/mineral premix consists of vitamin A, vitamin C, vitamin D, vitamin E, Thiamin, Riboflavin, Niacin, Vitamin B6, Folate, vitamin B12, Biotin, pantothenic acid, iron, iodine, zinc, manganese, and copper.

7. A powder mix according to claim 1 in which the carbohydrate component is present in an amount from about 30% to about 80% wt/wt.

8. A powder mix according to claim 7 in which the carbohydrate component is selected from the group consisting of granulated sucrose, glucose, glucose polymers, fructose, hydrolyzed corn starch, maltodextrin, corn syrup solids, lactose, high fructose corn syrup, fructooligosaccharides, artificial sweeteners and mixtures thereof.

9. A powder mix according to claim 1 in which the fat component is present in an amount no greater than about 7.5% wt/wt.

10. A powder mix according to claim 9 in which the fat component is selected from the group consisting of hydrogenated soy oil, hydrogenated coconut oil, high oleic safflower oil, soy oil, fractionated coconut oil, high oleic sunflower oil, corn oil, canola oil, creamers and inherent fat in milk and mixtures thereof.

* * * * *